US009823915B1

(12) United States Patent
Maloney (10) Patent No.: US 9,823,915 B1
(45) Date of Patent: Nov. 21, 2017

(54) SOFTWARE CONTAINER FORMAT

(71) Applicant: Mesosphere, Inc., San Francisco, CA (US)

(72) Inventor: Cody Maloney, San Francisco, CA (US)

(73) Assignee: Mesosphere, Inc., San Francisco, CA (US)

( * ) Notice: Subject to any disclaimer, the term of this patent is extended or adjusted under 35 U.S.C. 154(b) by 0 days.

(21) Appl. No.: 15/173,509

(22) Filed: Jun. 3, 2016

Related U.S. Application Data (60) Provisional application No. 62/202,049, filed on Aug. 6, 2015.

(51) Int. Cl.
*G06F 9/445* (2006.01)
*G06F 9/44* (2006.01)

(52) U.S. Cl.
CPC .............. *G06F 8/61* (2013.01); *G06F 9/4411* (2013.01)

(58) Field of Classification Search
CPC .............. G06F 8/61; G06F 8/63; G06F 9/4411
USPC ........................................................ 717/175
See application file for complete search history.

(56) References Cited

U.S. PATENT DOCUMENTS

| | | | | |
|---|---|---|---|---|
| 6,161,218 A | * | 12/2000 | Taylor | ....................... G06F 8/65 717/168 |
| 8,332,355 B2 | * | 12/2012 | Cannon | ................... G06F 21/73 707/626 |
| 2016/0365981 A1 | * | 12/2016 | Medvinsky | ........... H04L 9/3247 |
| 2016/0365983 A1 | * | 12/2016 | Shahabuddin | ........ H04L 9/3249 |

OTHER PUBLICATIONS

Author Unknown, "Revisiting How We Put Together Linux Systems", Sep. 1, 2014, http://0pointer.net/blog/revisiting-how-we-put-together-linux-systems.html.
Nathan Willis, "GNOME and application sandboxing revisited", Jan. 21, 2015, https://lwn.net/Articles/630216/.
Author Unknown, "Snappy Transactional System Updates on a//b systems", Mar. 13, 2016, https://web.archive.org/web/20160313122047/http:/developer.ubuntu.com/en/snappy/guides/system-updates/.

* cited by examiner

*Primary Examiner* — Anna Deng
(74) *Attorney, Agent, or Firm* — Van Pelt, Yi & James LLP (57) ABSTRACT

A system for building a package with a deterministic identifier for selective software component installation comprises an interface and a processor. The interface is to receive package configuration information. The processor is to retrieve build resources; determine a deterministic package identifier based at least in part on the build resources; build a package based at least in part on the package configuration information using the build resources; and provide the package. The package includes the deterministic package identifier. A selected software component from the package is installed on a target system.

22 Claims, 9 Drawing Sheets

SOFTWARE CONTAINER FORMAT

CROSS REFERENCE TO OTHER APPLICATIONS

This application claims priority to U.S. Provisional Patent Application No. 62/202,049 entitled MESOSPHERE CONTAINER FORMAT filed Aug. 6, 2015 which is incorporated herein by reference for all purposes.

BACKGROUND OF THE INVENTION

When distributing software to a large number of computers (e.g., a large computing cluster within a data center), the software must install correctly with a high degree of reliability. Small differences in versions of code (e.g., operating systems or libraries) between a development system and a deployment system can cause indeterminate errors when building and operating software, creating a problem for installation of software on a wide variety of systems.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for building a package with a deterministic identifier for selective software component installation comprises an interface to receive package configuration information and a processor to retrieve build resources, determine a deterministic package identifier based at least in part on the build resources, build a package based at least in part on the package configuration information using the build resources, and provide the package, wherein the package includes the deterministic package identifier, wherein a selected software component from the package is installed on a target system.

In some embodiments, a system for building a package with a deterministic, reproducible identifier for selective software component installation comprises a system for building a package in an isolated environment. The package comprises built software as well as all necessary resources for running the software in order to ensure that the software will run correctly on a target computer. Building the package in an isolated environment allows control over available resources, ensuring that only the specified set of resources is used in the build process. In the event different versions of the software are to be used by different target computers (e.g., a master and an agent of a cluster system), all necessary versions are built together into the package such that the same package can be distributed to all target computers. The deterministic package identifier uniquely identifies every distinct build of the package, allowing multiple versions to exist at the same time on a target computer. This simplifies the rollback process in the event a software bug is determined in an installed version.

In some embodiments, the system for building a package comprises an interface to receive package configuration information. A package comprises a collection of arbitrary data in the form of binary files that will, upon install to a target system, live at a well-known path based on the deterministic package identifier. A package comprises a method of specifying that 1) some package contents are private to the package whereas other package content are visible to only packages that depend on the package; and 2) some package data is shared with every other package on the system, as well as any users who interact with the system. The binary files may represent any form of content, including but not limited to text files, executables, code binaries, images, and documents. In the context of the system, multiple packages combine together, sharing their resources to make the full set of fully functional programs, configuration, and data for an environment. In some embodiments, package configuration information comprises one or more references to source code (e.g., source code paths, source code universal resource locators (URLs), source code git information, etc.). In some embodiments, package configuration information comprises one or more references to libraries (e.g., shared resources used for building source code, e.g., library paths, library universal resource locators (e.g., URLs), library git information, etc.). The system for building a package additionally comprises a processor to retrieve the build resources (e.g., download build resources, extract packaged build resources, uncompress compressed build resources, etc.). The system then creates a deterministic package identifier based on the build resources. If any of the build resources change (e.g., source code version, library version) the deterministic package identifier is guaranteed to change. An installation system can use the deterministic package identifier to distinguish different versions of the package or to verify that it has the desired version. In some embodiments, the deterministic package identifier is created based on a hash of the build resources. The system for building a package creates an isolated build environment for building the package. In some embodiments, the isolated build environment comprises a docker container. In some embodiments, the isolated build environment comprises a new isolated build environment. In some embodiments, the isolated build environment is cleaned prior to the build (e.g., previous source code is deleted, previous libraries are deleted, previous build artifacts are deleted, etc.). In some embodiments, the build resources (e.g., source code and libraries) are copied into the build environment. After the package software is built in the build environment, it is copied out of the build environment along with any required libraries and packaged. In some embodiments, packaging comprises using a tape archive (e.g., tar) function. In some embodiments, packaging comprises using compression. The package requires a minimum of other software in order to function on an installation server. In some embodiments, a set of packages are re-packaged together to form a bootstrap package. In some embodiments, one of the software applications of the bootstrap package comprises a package manager application for managing (e.g., installing, removing, upgrading, rolling back, etc.) applications in the package. In some embodiments, the bootstrap package is installable using only pre-existing system software, and once installed, allows operating and managing packages. When the package is to be installed on a server it is copied to the server and unpackaged. The package manager application can then be used to install other applications from the package. In some embodiments, the server is associated with a role (e.g., a tag indicating the function of the installation server—for example, master, agent, etc.). In some embodiments, applications from the package are determined for installation automatically based at least in part on the role (e.g., all master applications are installed on the master server, etc.). In some embodiments, the server comprises an installation server (e.g., a server for installing applications on itself and/or other systems). In some embodiments, a machine is assigned multiple roles. For example, a machine is assigned to be both a master and an agent.

In some embodiments, roles are associated with variants of a piece of software. A variant comprises the same version of the software, built two slightly different ways. In some embodiments, the notion of "version" is also associated with the deterministic package identifier, since within the system there can be multiple versions/copies of a package with different package identifiers present at the same time, and swap between them freely for upgrades/downgrades. In some embodiments, each package with its ID internally contains all the variants of the software that were packaged as part of the package (e.g., master, slave, installer, etc.).

Figure 1:
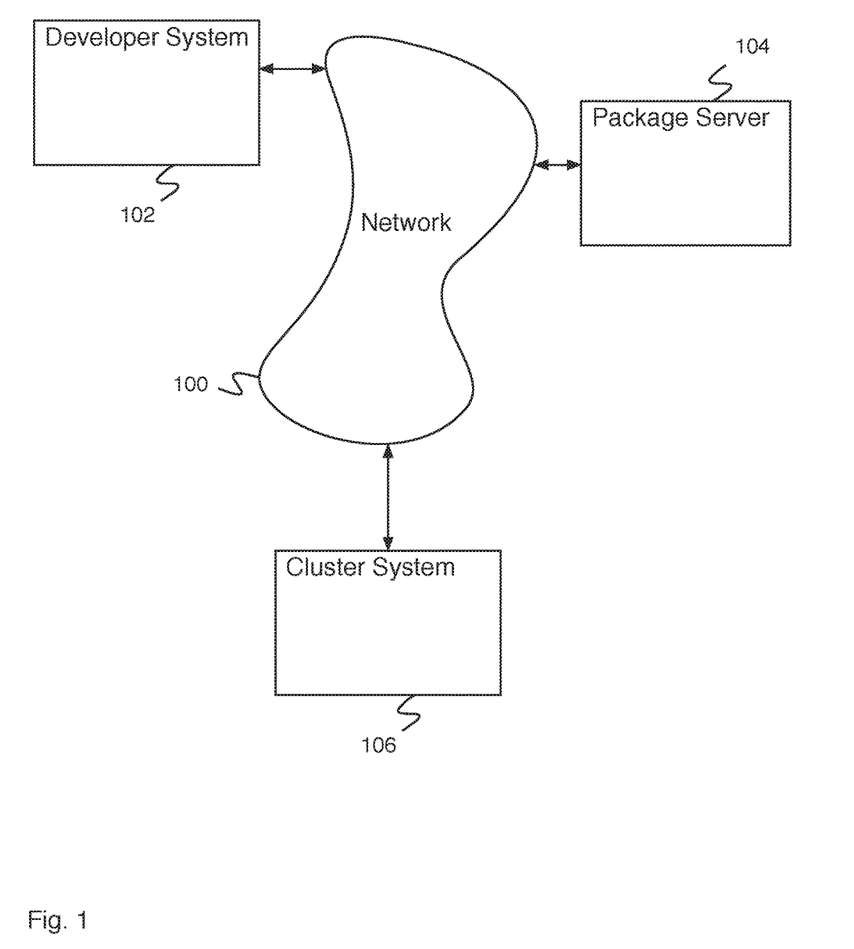
FIG. 1 is a block diagram illustrating an embodiment of a network system.

FIG. 1 is a block diagram illustrating an embodiment of a network system. In some embodiments, the network system of FIG. 1 comprises a system for distributing software. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Developer system 102, package server 104, and cluster system 106 communicate via network 100. Developer system 102 comprises a system for a developer. In various embodiments, developer system 102 comprises a system for a developer to develop applications, to run applications, to build applications, to package applications, to distribute applications, or for any other appropriate purpose. In some embodiments, developer system 102 comprises a processor and a memory. In some embodiments, developer system 102 provides packaged applications to package server 104. In various embodiments, package server 104 comprises a packaged application, a group of packaged applications, multiple versions of a packaged applications, a bootstrap package comprising a set of packaged applications, or any other appropriate software packages. In some embodiments, package server 104 comprises a processor and a memory. Cluster system 106 comprises a cluster system for executing computing tasks. In some embodiments, cluster system 106 comprises a cluster of computers (e.g., a plurality of interconnected computers for executing a large computing job at a set of small pieces). In some embodiments, computers of cluster system 106 comprise various roles (e.g., master, agent, installer, etc.). In some embodiments, cluster system 106 comprises a processor and a memory. In various embodiments, each of the one or more computers of cluster system 106 comprises a single-processor computer, a multiple-processor computer, a plurality of computers, a mobile computer, a tablet computer, or any other appropriate computer. In various embodiments, the developer system and package server both live on top of the cluster system, both run on machines in the cluster system, are both located on the same computer, or any other appropriate allocation of developer system and package server in relation to the cluster system and the computers of the cluster system.

Figure 2:
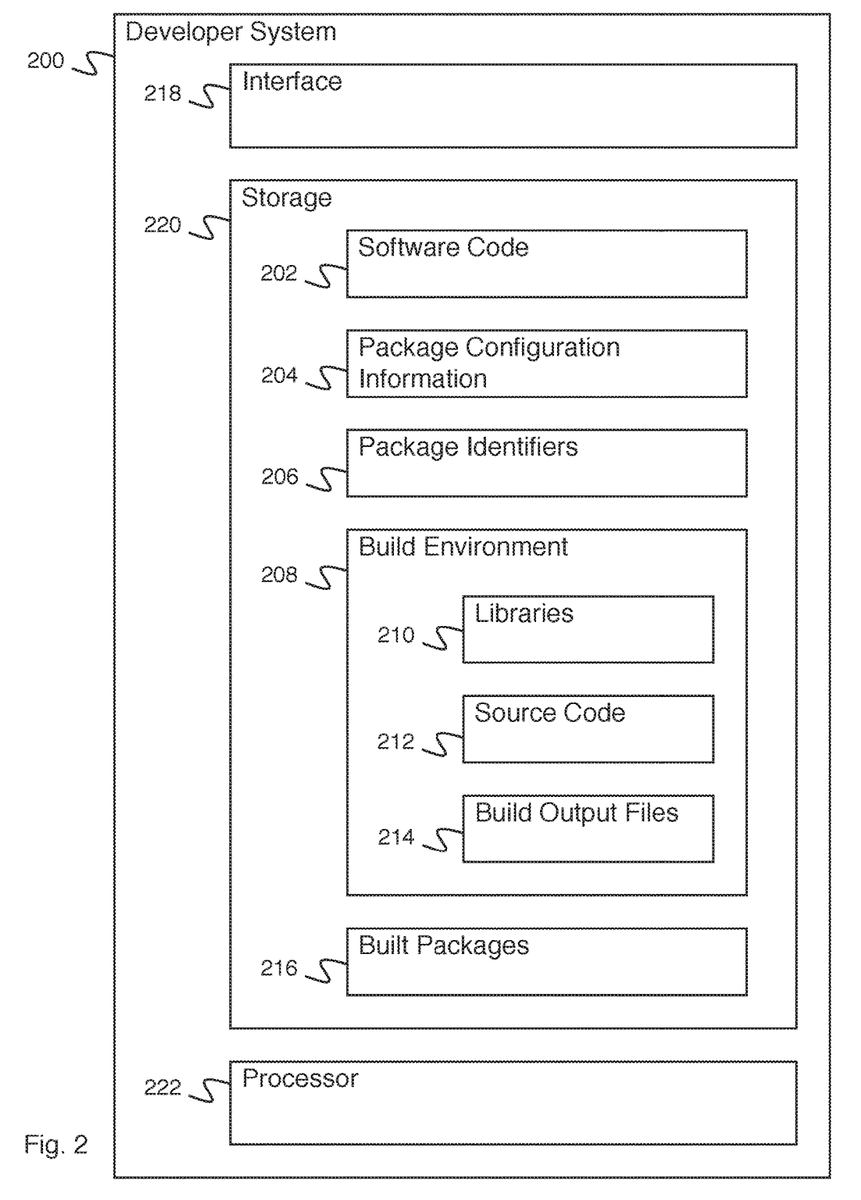
FIG. 2 is a block diagram illustrating an embodiment of a developer system.

FIG. 2 is a block diagram illustrating an embodiment of a developer system. In some embodiments, developer system 200 comprises developer system 102 of FIG. 1. In the example shown, developer system 200 comprises a developer system for developing an application and creating a package. Developer system 200 comprises interface 218, storage 220, and processor 222. Interface 218 comprises an interface for receiving and/or providing information. In various embodiments, interface 218 comprises an interface for receiving and/or providing source code, libraries, code metadata, buildinfo data files, build executable files, package configuration information, packages, or any other appropriate information. Processor 222 comprises a processor for processing information. In various embodiments, processor 222 comprises a processor for building software, for determining a package identifier, for preparing a build environment, for creating a package, for compressing data, for encrypting data, or for processing data in any other appropriate way. In some embodiments, processor 222 comprises a processor for providing a package (e.g., to interface 218). Storage 220 comprises a storage for storing data (e.g., source code, built code, packages, metadata, identifier data, software resource data, virtual machine data, container data, or any other appropriate data). In the example shown, storage 220 comprises software code 202, package configuration information 204, package identifiers 206, build environment 208, and built packages 216. In various embodiments, software code 202 comprises source code, software libraries, links to software (e.g., links to software stored on a remote server—for example, a git server, links to libraries, etc.), shell scripts, software configuration code, or any other appropriate software code. Developer system 200 additionally comprises package configuration information 204. In some embodiments, package configuration information 204 comprises information for building a package. In some embodiments, package configuration information 204 comprises package configuration information for a set of packages. In some embodiments, package configuration information for a package comprises a build executable file and a buildinfo data file. In some embodiments, a build executable file comprises a shell script. In various embodiments, a build executable file comprises a program for setting environment variables, for executing commands to build a software application, for creating install directories, or for any other appropriate build purpose. In various embodiments, a buildinfo data file comprises a shell script, a text file, a json file, or any other appropriate buildinfo file type. In various embodiments, a buildinfo data file comprises environment variables, software locations, links to software, software authentication information, required software information, container names, or any other appropriate software build information. In some embodiments, a developer stores package configuration information for software that is ready to be built in package configuration information 204. Package identifiers 206 comprises one or more package identifiers. In some embodiments, when a software package is built on a developer system, a package identifier is determined. In some embodiments, a package identifier is determined based at least in part on package configuration information (e.g., package configuration information 204). In some embodiments, a package identifier is determined based at least in part on software code (e.g., source code and libraries—for example, stored in software code 202) indicated by package configuration information. In some embodiments, a package identifier is determined based at least in part on a hash. In some embodiments, a package identifier uniquely identifies a package based on the resources (e.g., source code and libraries) used for building the package. Build environment 208 comprises a build environment for building software. In some embodiments, build environment 208 comprises a build environment customized for building a specific software package (e.g., associated with a specific set of package configuration information of package configuration information 204). In some embodiments, developer system 200 comprises one or more build environments, each build environment associated with a specific software package. In some embodiments, build environment 208 is used for all software builds for developer system 200. In some embodiments, build environment 208 is cleaned between builds. In some embodiments, build environment 208 comprises an isolated environment for cleanly building software (e.g., a shell, a virtual machine, a docker container, etc.). In the example shown, build environment 208 comprises libraries 210 (e.g., shared libraries for building software), source code 212, and build output files 214. In some embodiments, when software is to be built on developer system 200, previous versions of libraries 210 and source code 212, and previously generated build output files 214 are deleted. Up to date versions of libraries 210 and source code 212 are copied into build environment 208, and software is built (e.g., according to a build script of package configuration information 204). Output files are stored in build output files 214. When software has successfully built, software executable files are copied out of build environment 208 and packaged to create a built package. In some embodiments, built packages additionally comprise libraries (e.g., libraries required by the software executable files to run). In some embodiments, built packages additionally comprise a package identifier (e.g., a package identifier stored in package identifiers 206). Built packages are stored in built packages 216. In some embodiments, packaging software comprises using an archive (e.g., tar) function. In some embodiments, packaging software comprises using compression.

Figure 3:
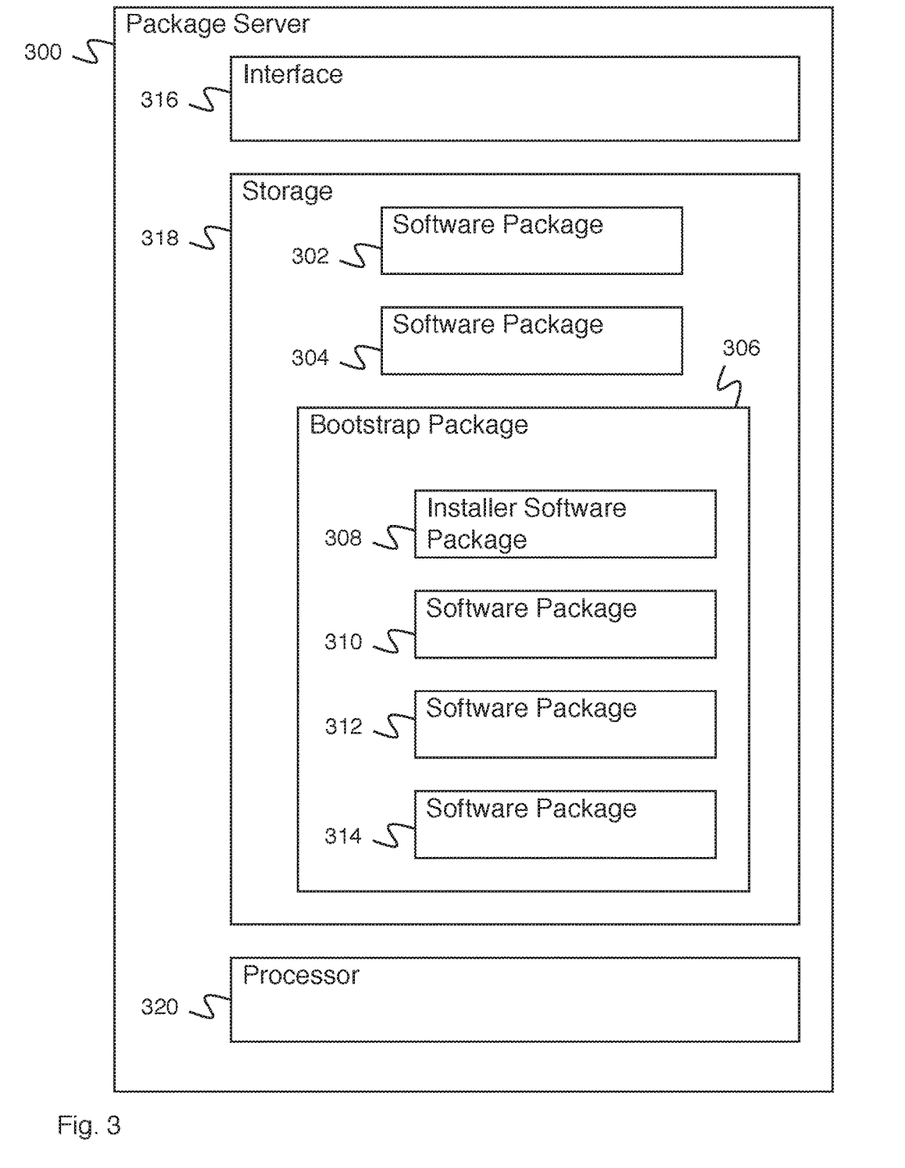
FIG. 3 is a block diagram illustrating an embodiment of a package server.

FIG. 3 is a block diagram illustrating an embodiment of a package server. In some embodiments, package server 300 comprises package server 104 of FIG. 1. In the example shown, package server 300 comprises interface 316, storage 318, and processor 320. Interface 316 comprises an interface for receiving and/or providing information. In various embodiments, interface 316 comprises an interface for receiving and/or providing software packages, software code, a bootstrap package, package metadata, or any other appropriate information. Processor 320 comprises a processor for processing data. In various embodiments, processor 320 comprises a processor for coordinating receiving, storing, and transmitting software packages. Storage 318 comprises a storage for storing data. In the example shown, storage 318 comprises a set of packages (e.g., software package 302, software package 304, bootstrap package 306). In some embodiments, each software package comprises a built package (e.g., a built package as in built packages 216 of FIG. 2—for example, comprising software executable files, libraries, a package identifier, etc.). In some embodiments, each software package comprises software for a different purpose (e.g., data sorting software, data filtering software, data processing software, data analysis software, communications software, etc.). In some embodiments, a software package comprises multiple variants of a software application, each version associated with a role. In some embodiments, when a software package is installed on a computer using an installer, the variant associated with the role associated with the computer is installed. Bootstrap package 306 comprises a package for installing software on a computer that has not yet installed software from package server 300. Bootstrap package 306 comprises installer software package 308. In some embodiments, installer software package 308 comprises a software installer for installing other software packages. Bootstrap package 306 additionally comprises a set of software packages (e.g., software package 310, software package 312, and software package 314) for setting up a computer to perform a desired set of functions. In some embodiments, software packages of the set of software packages are installed using installer software package 308.

Figure 4:
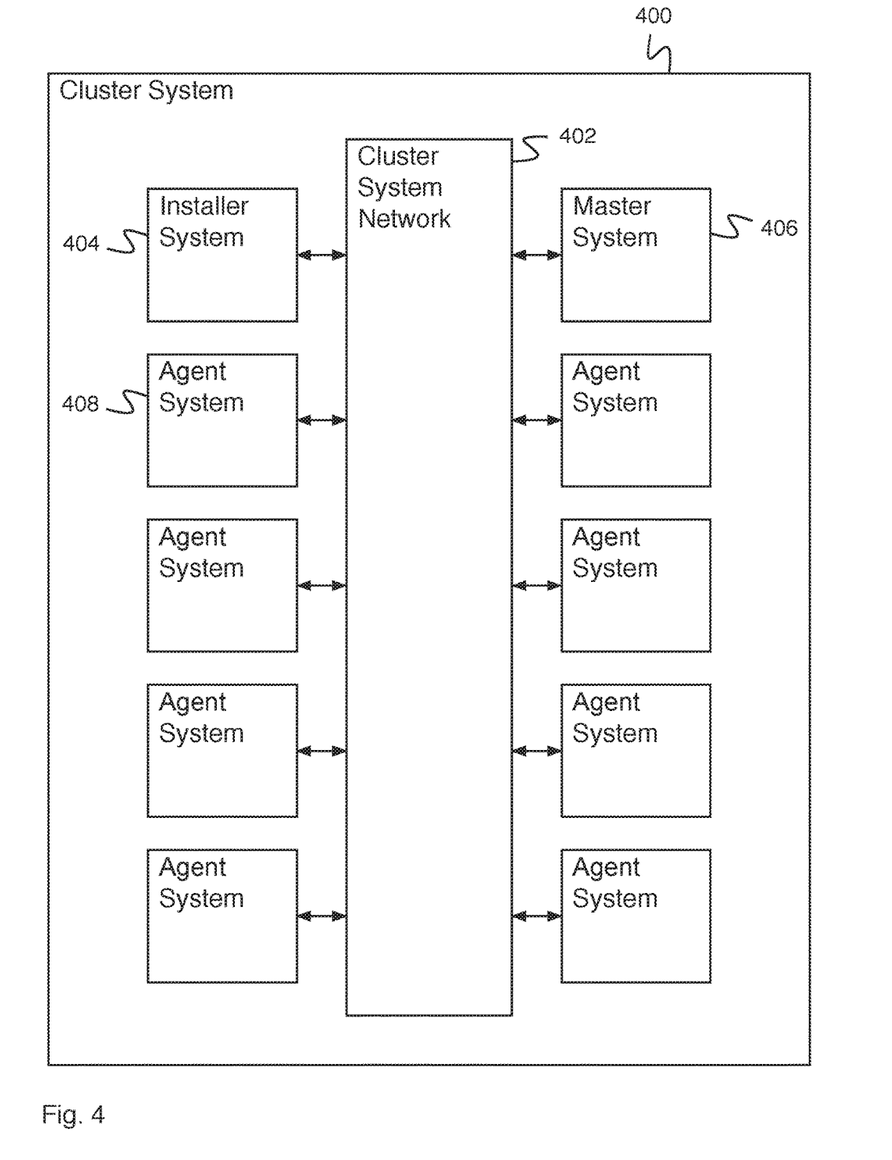
FIG. 4 is a block diagram illustrating an embodiment of a cluster system.

FIG. 4 is a block diagram illustrating an embodiment of a cluster system. In some embodiments, cluster system 400 comprises a cluster system for performing cluster computing tasks. In some embodiments, cluster system 400 comprises cluster system 106 of FIG. 1. In the example shown, cluster system 400 comprises a set of systems (e.g., installer system 404, master system 406, a plurality of agent systems—for example, agent system 408) communicating via cluster system network 402. In various embodiments, cluster system network 402 comprises one or more of the following: a local area network, a wide area network, a wired network, a wireless network, the Internet, an intranet, a storage area network, or any other appropriate network. Installer system 404 comprises a system for installing software on other systems of cluster system 400. In some embodiments, installer system 404 communicates with a package server (e.g., package server 300 of FIG. 3) to receive a bootstrap package comprising an installer software package and other software packages. In some embodiments, installer system 404 uses the installer software package to install software on itself and on other systems of cluster system 400. Master system 406 comprises a master system for coordinating cluster computing jobs. In various embodiments, master system 406 receives job requests, segments a job, provides job segments to agent systems, receives job segment results from agent systems, combines job segment results to determine a job result, provides a job result in response to a job request, or performs any other appropriate master system function. The one or more agent systems (e.g., agent system 408) comprise agent systems for executing cluster computing job segments as instructed by master system 406. In some embodiments, an indication of a cluster system role (e.g., installer system, master system, agent system) is stored on each system. In various embodiments, a role is stored as a configuration file, an environment variable, a role shell script, or in any other appropriate way. In some embodiments, when software is installed on a system (e.g., by installer system 404), the software installed is determined based at least in part on the role. In some embodiments, software packages comprise multiple software versions, each version specific to a cluster system role. In various embodiments, systems or system components are collocated on the same node of a cluster or are located in separate nodes of the cluster system or in any appropriate combination thereof.

Figure 5:
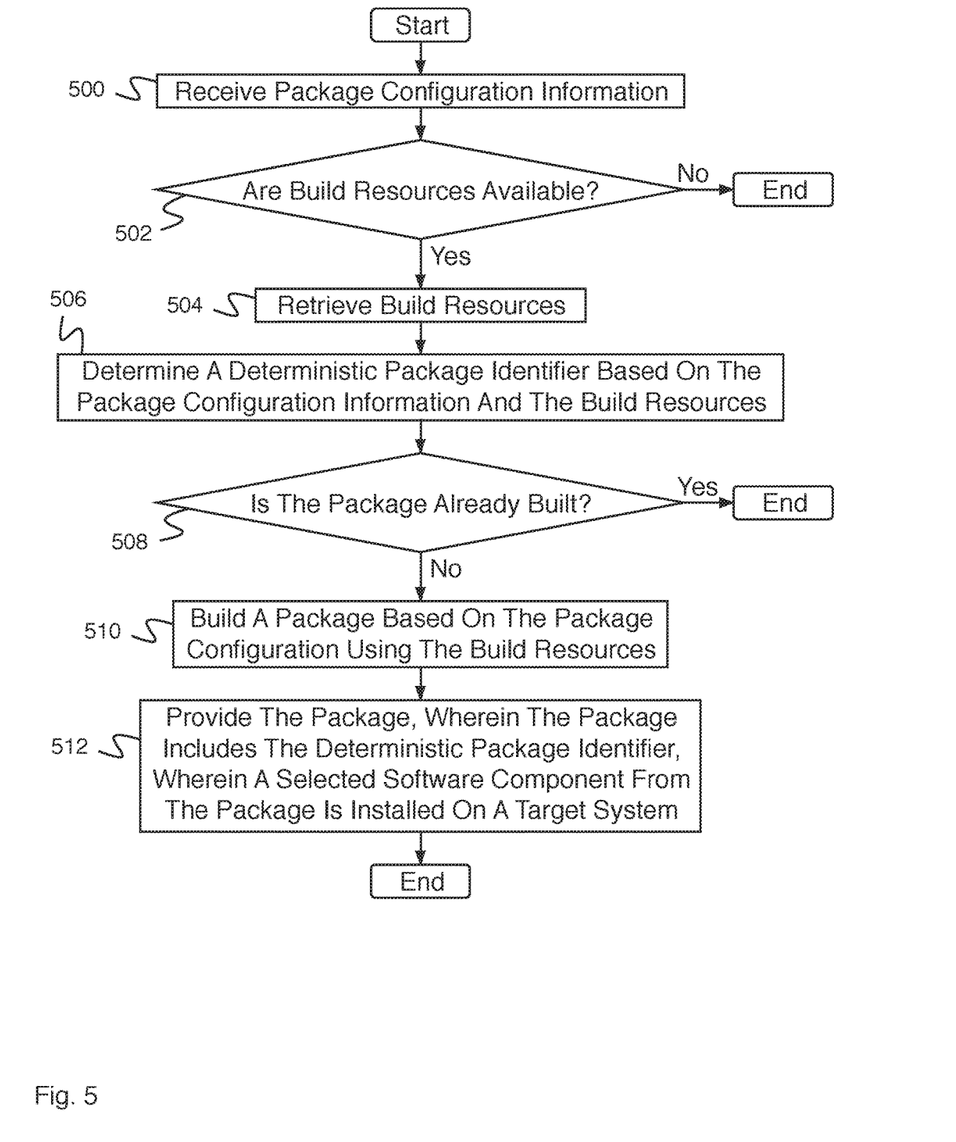
FIG. 5 is a flow diagram illustrating an embodiment of a process for building a package.

FIG. 5 is a flow diagram illustrating an embodiment of a process for building a package. In some embodiments, the process of FIG. 5 is executed by a developer system (e.g., developer system 102 of FIG. 1. In the example shown, package configuration information is received. In some embodiments, package configuration information comprises a build executable file. In some some embodiments, package configuration information comprises a buildinfo file. In various embodiments, package configuration information is received from a developer, from a package configuration information repository, from another developer system, from a storage location within the developer system filesystem, or from any other appropriate location or entity. In 502, it is determined whether build resources are available. In various embodiments, build resources comprise local resources, resources stored on a remote server, resources stored within a version control system (e.g., a Git™ system, GitHub™, etc.), software libraries, source code, or any other appropriate resources. In the event it is determined that build resources are not available, the process ends. In some embodiments, an error message is provided indicating that build resources are not available. In the event it is determined in 502 that build resources are available, control passes to 504. In 504, build resources are retrieved. In various embodiments, retrieving build resources comprises copying locally stored build resources to a working directory, downloading build resources stored on a remote server, checking out build resources from a version control system, unarchiving build resources, uncompressing build resources, unencrypting build resources, or retrieving build resources in any other appropriate way. In 506, a deterministic package identifier is determined based on the package configuration information and the build resources. In 508, it is determined whether the package is already built. In some embodiments, determining whether the package is already built comprises determining whether there is a build package comprising the deterministic package identifier determined in 506. In the event it is determined that the package is already built, the process ends. In some embodiments, a notice is provided indicating that the package was not built, rather a pre-existing build is to be used. In the event it is determined in 508 that the package is not already built, control passes to 510. In 510, a package is built based on the package configuration using the build resources. In various embodiments, building a package comprises compiling software, archiving software, compressing software, encrypting software, storing software, transmitting software, or building a package in any other appropriate way. In some embodiments, a package comprises multiple variants of software, each variant associated with a role. In 512, the package is provided, wherein the package includes the deterministic package identifier, wherein a selected software component from the package is installed on a target system.

Figure 6:
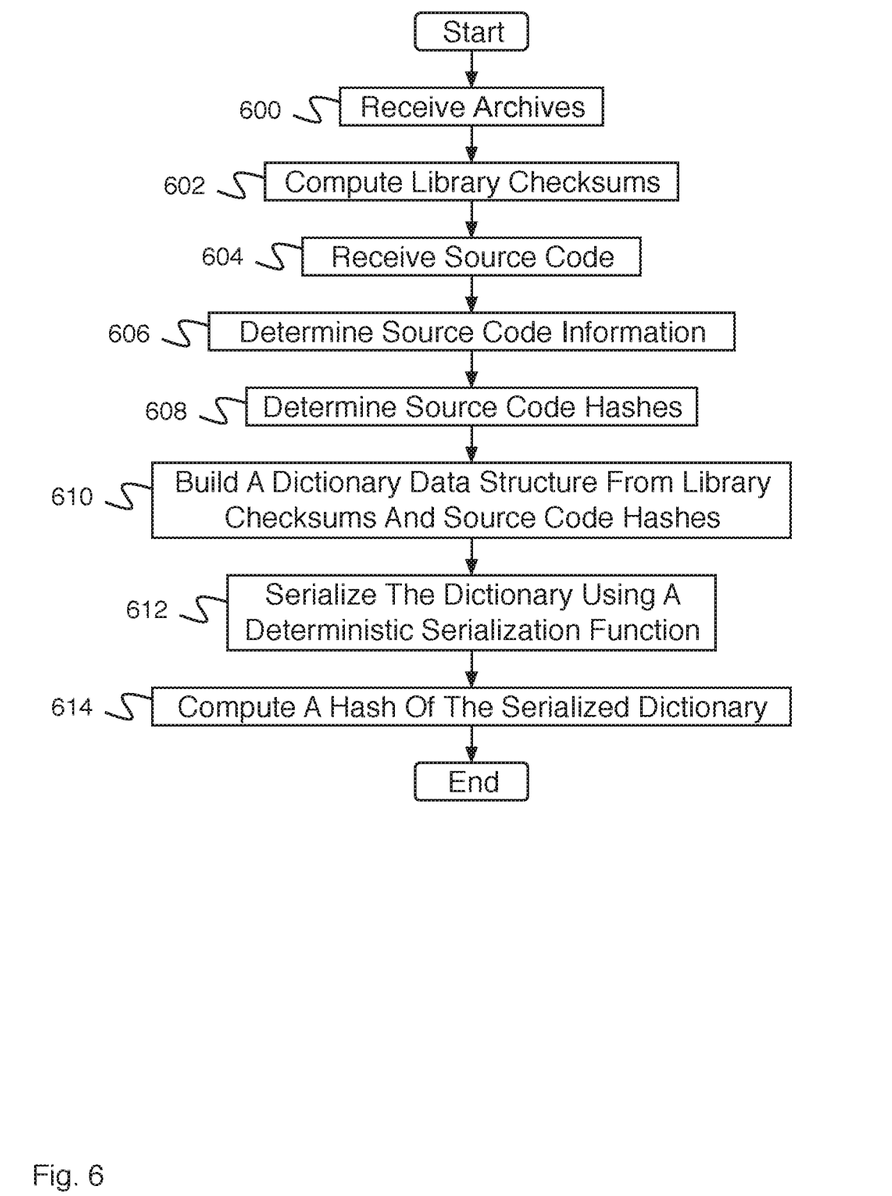
FIG. 6 is a flow diagram illustrating an embodiment of a process for determining a deterministic package identifier based on a package configuration and build resources.

FIG. 6 is a flow diagram illustrating an embodiment of a process for determining a deterministic package identifier based on a package configuration and build resources. In some embodiments, the process of FIG. 6 implements 506 of FIG. 5. In the example shown, in 600, archives are received. In various embodiments, libraries are received from a developer, from local storage, from a server system, from a version control system, or from any other appropriate system. In some embodiments, libraries comprise libraries specified in a package configuration. In 602, library checksums are computed (e.g., the library data is hashed). In some embodiments, any modification to a library results in a change to the associated computed library checksum. In some embodiments, computing library checksums comprises determining a set of hashes. In 604, source code is received. In various embodiments, source code is received from a developer, from local storage, from a server system, from a version control system, or from any other appropriate system. In 606, source code information is determined. In various embodiments, source code information comprises version control commit information, source code modification information, source code storage history information, source code hash information, source code metadata, source code metadata hash information, source code, or any other appropriate source code information. In some embodiments, source code information and/or build environment information includes a docker image ID of the docker container which will be used as the build environment. In some embodiments, source code information and/or build environment information includes hashes of certain programs, the version of docker, or any other appropriate information. In some embodiments, determining source code information comprises receiving source code information (e.g., from a source code server, a version control server, a git server, etc.). In 608, source code hashes are determined (e.g., the source code information is hashed). In some embodiments, any modification to the source code results in a modification to the computed source code hash. In some embodiments, determining source code hashes comprises receiving source code hashes. In some embodiments, determining source code hashes comprises determining a set of hashes. In 610, a dictionary data structure is built from the library checksums and the source code hashes. In some embodiments, a dictionary data structure stores data values associated with data keys in an unordered fashion. In some embodiments, the dictionary is built by associating serially assigned keys with each library checksum and source code hash. In 612, the dictionary is serialized using a deterministic serialization function. In some embodiments, the deterministic serialization function guarantees that for a given set of library checksums and source code hashes, the serialized dictionary is always the same. In some embodiments, the deterministic serialization function sorts the data values by the dictionary value raw data, ignoring the keys, and serializes the sorted data. In 614, a hash of the serialized dictionary is computed. Any change to the serialized dictionary results in a change to the hash, thus any change to the received libraries or received source code results in a change to the hash. The hash thus comprises an identifier associated with a software build from the received source code and received libraries. Builds using the same code and libraries will produce the same identifier, builds using different libraries will produce different identifiers.

Figure 7:
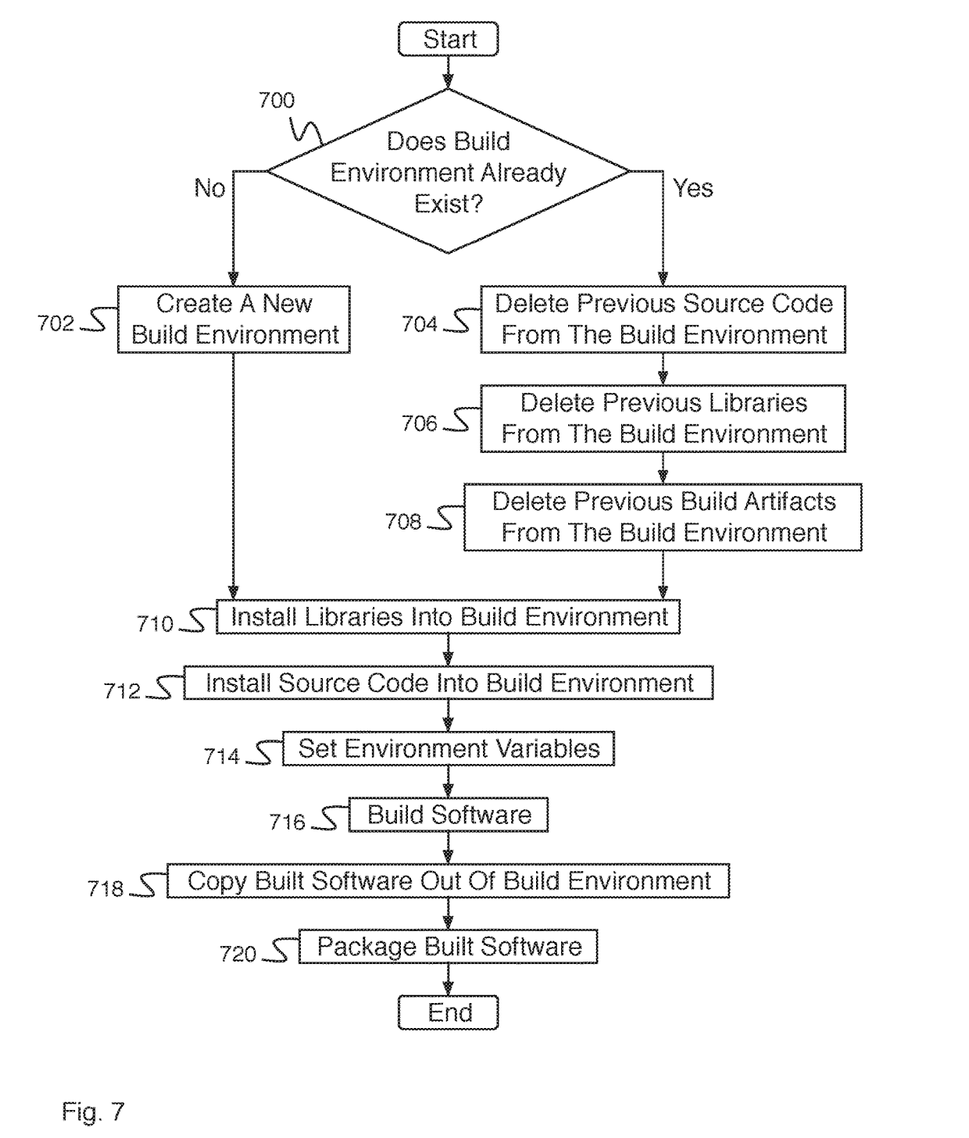
FIG. 7 is a flow diagram illustrating an embodiment of a process for building a package based on a package configuration using build resources.

FIG. 7 is a flow diagram illustrating an embodiment of a process for building a package based on a package configuration using build resources. In some embodiments, the process of FIG. 7 implements 510 of FIG. 5. In the example shown, in 700, it is determined whether a build environment already exists. In various embodiments, a build environment comprises a dedicated computer, an isolated shell, a virtual machine, a docker container, or any other appropriate build environment. In some embodiments, the build environment is associated with the package being built (e.g., multiple build environments are used, one for each package). In some embodiments, one build environment is used for all builds. In the example shown, in the event it is determined that the build environment does not already exist, control passes to 702. In 702, a new build environment is created. In various embodiments, creating a new build environment comprises designating a computer as a build environment, creating a new virtual machine, creating a new docker container, or creating a new build environment in any other appropriate way. Control then passes to 710. In the event it is determined in 700 that the build environment already exists, control passes to 704. In 704, previous source code (e.g., source code used for previous builds) is deleted from the build environment. In 706, previous libraries (e.g., libraries used for previous builds) are deleted from the build environment. In 708, previous build artifacts (e.g., compiled software, error output files, standard output files, build status files, etc.) are deleted from the build environment. In 710, libraries (e.g., libraries of the build resources) are installed into the build environment. In 712, source code (e.g., source code of the build resources) is installed into the build environment. In 714, environment variables are set. In some embodiments, environment variables are set according to the package configuration. In 716, the software is built. In 718, the built software is copied out of the build environment. In some embodiments, libraries required for the software to run are copied out of the build environment. In 720, the built software is packaged. In various embodiments, packaging build software comprises archiving the built software, compressing the built software, encrypting the built software, renaming the built software, tagging the built software with a deterministic package identifier, or packaging the built software in any other appropriate way. In some embodiments, the package is provided to a package server or to a target computer for installation. In some embodiments, providing the package to the target computer for installation automatically causes the package to be unpackaged and software to be installed. In some embodiments, after the software is built (e.g., in 716) the built software is packaged (e.g., in the build environment). In some embodiments, the packaged software is then copied out of the build environment. In some embodiments, the packaged software is copied directly from the build environment to a package server or a target computer.

Figure 8:
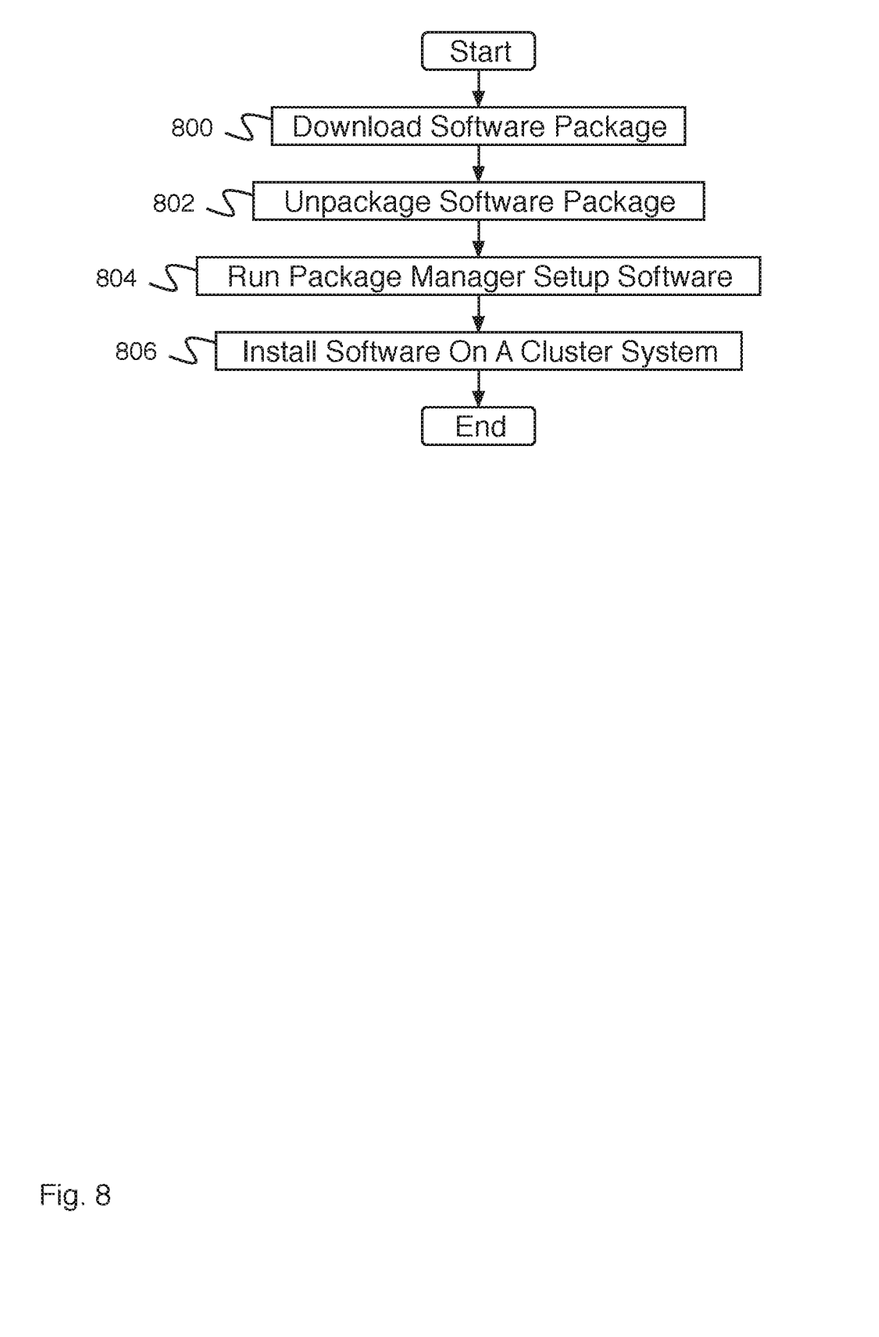
FIG. 8 is a flow diagram illustrating an embodiment of a process for installing software.

FIG. 8 is a flow diagram illustrating an embodiment of a process for installing software. In some embodiments, the process of FIG. 8 is executed by an installer system (e.g., installer system 404 of FIG. 4). In some embodiments, the process of FIG. 8 is executed by a cluster system (e.g., an installer system, a master system, an agent system, etc.). In the example shown, in 800, a software package is downloaded. In some embodiments, a software package comprises a bootstrap package (e.g., bootstrap package 306 of FIG. 3). In 802, the software package is unpackaged (e.g., unarchived, uncompressed, unencrypted, etc.). In 804, package manager setup software is run. In some embodiments, the package manager setup software comprises an installer software package. In 806, software is installed on a cluster system. In some embodiments, software is installed on one or more cluster systems. In some embodiments, software is installed only on the system executing the process (e.g., the system does not install software on other systems, the process of FIG. 8 is executed by each cluster system).

In some embodiments, downloading the software package to the cluster system automatically causes unpackaging and installation of software on the cluster system. In some embodiments, downloading the software package to the cluster system automatically causes unpackaging and installation of software on one or more cluster systems. In some embodiments, downloading the software package to the cluster system automatically causes unpackaging and installation of software on all cluster systems of a computing cluster. In some embodiments, a build system uploads the package to a cluster system. In some embodiments, by uploading the package to a cluster system, the build system causes installation of software on one or more cluster systems.

In some embodiments, downloading/fetching a piece of software to a host is independent from actually having that particular version of that piece of software be active on the host. In some embodiments, in an isolated install environment, multiple different versions of a package are fetched to a host but not actually put into use. Only one version of a package is in use at a time (Although multiple variants may be in use at the same time). In some embodiments, for an initial software bootstrap, a single bootstrap package is downloaded, unpacked, and used. After that point in time to manage the software at runtime, an arbitrary number of new or replacement packages may be fetched to the host. At a later point in time, any subset of the packages on a host (at most one version per package name), may be activated together atomically.

In some embodiments, activating packages is done as an operation on a set of packages. At arbitrary points in time, independently the set of packages are all fetched to the system. Then, when it is decided to activate them, an administrator (or the package system) chooses a set of packages which should be activated. If the packages are not present on the system which is told to activate them, the system exits and prints an error message. In some embodiments, a validation step checks that the full set of packages which are being activated together do not conflict with each other.

Figure 9:
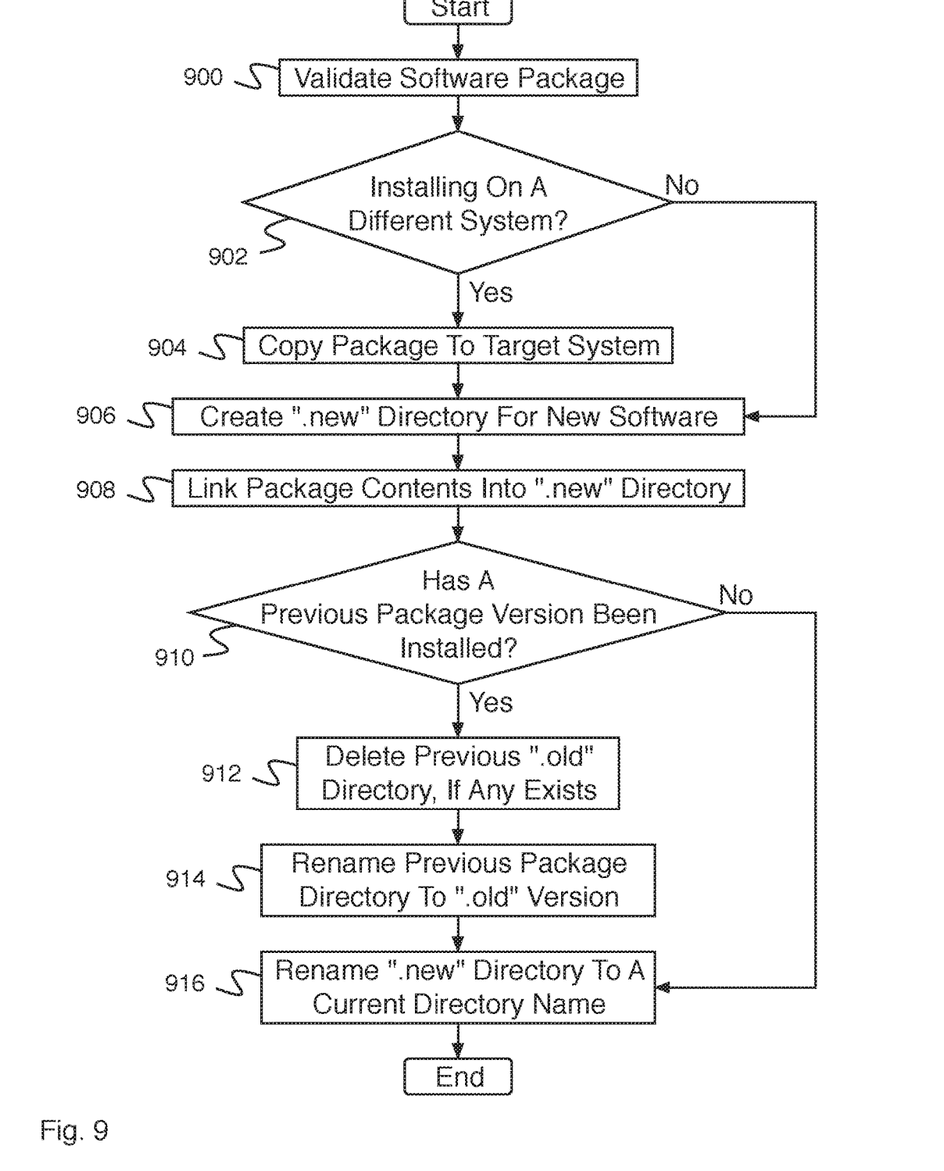
FIG. 9 is a flow diagram illustrating an embodiment of a process for installing software on a cluster system.

FIG. 9 is a flow diagram illustrating an embodiment of a process for installing software on a cluster system. In some embodiments, the process of FIG. 9 implements 806 of FIG. 8. In the example shown, in 900 the software package is validated. In various embodiments, validating the software package comprises determining the software package has the correct hash, validating that the software package is consistent with itself (e.g., the package ID of the tarball matches the package ID embedded inside the package), validating that packages do not conflict, validating that dependencies are met, or validating the software package in any other appropriate way. In 902, it is determined whether the process is installing on a different system (e.g., installing the software on a system other than the one executing the process). In the event it is determined that the process is not installing on a different system, control passes to 906. In the event it is determined that the process is installing on a different system, control passes to 904. In 904, the package is copied to the target system. In some embodiments, the package name comprises the associated deterministic package identifier, allowing multiple different package builds of the same package to exist together on the same system. In 906, a ".new" directory is created for the new software. In some embodiments, the ".new" directory name comprises a concatenation of the software application name with the extension ".new". In 908, the package contents are linked into the ".new" directory (e.g., symbolic links are created from files in the new software package to files in the ".new" directory). In 910, it is determined whether a previous package version has been installed (e.g., whether a previous version of the package was installed on the system). In the event it is determined that a previous package version has not been installed, control passes to 916. In the event it is determined that a previous package version has been installed, control passes to 912. In 912, a previous ".old" directory is deleted, if any exists. In some embodiments, a ".old" directory name comprises a concatenation of the software application name with the extension ".old". In some embodiments, a previous ".old" directory exists in the event more than one previous version of the package has been installed on the system. In 914, the previous package directory (e.g., the most recent active package directory) is renamed to a ".old" version. In 916, the ".new" directory is renamed to a current directory name. In some embodiments, the current directory name comprises the name of the software application.In some embodiments, rather than "new" and "old" directories, there is a series of directories, one created for each potential activation, and there is a "current" directory with a symlink to the selected directory of the series of directories which is in use. In some embodiments, the system can hot swap between the directories in the series of directories.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for building a package with a deterministic identifier for selective software component installation, comprising:
an interface to:
receive package configuration information; and
a processor to:
retrieve build resources;
determine a deterministic package identifier based at least in part on the build resources, wherein determining the deterministic package identifier comprises:
determining a set of hashes, wherein each hash of the set of hashes comprises a hash of a build resource of the build resources,
creating a dictionary of the set of hashes,
determining a serialization by serializing the dictionary in a deterministic way, and
determining the deterministic package identifier by computing a hash of the serialization;
build a package based at least in part on the package configuration information using the build resources; and
provide the package, wherein the package includes the deterministic package identifier, wherein a selected software component from the package is installed on a target system.

2. The system of claim 1, wherein the package configuration information comprises a build script.

3. The system of claim 1, wherein the package configuration information comprises a build information file.

4. The system of claim 1, wherein build resources comprise source code.

5. The system of claim 1, wherein build resources comprise libraries.

6. The system of claim 1, wherein the processor is further to:
determine whether build resources are available; and
in the event build resources are not available:
provide an error message and end the process.

7. The system of claim 1, wherein the processor is further to prepare a build environment for building the package.

8. The system of claim 7, wherein preparing a build environment comprises creating a new container environment.

9. The system of claim 7, wherein preparing a build environment comprises removing previous build artifacts and source code from a container environment.

10. The system of claim 7, wherein preparing a build environment comprises installing libraries and source code into a container environment.

11. The system of claim 7, wherein package software is built within the build environment.

12. The system of claim 11, wherein the package is created by copying the package software out of the build environment and packaging the package software.

13. The system of claim 1, wherein the processor is further to:
determine whether building the package succeeded; and
in the event building the package did not succeed:
provide an error message and end the process.

14. The system of claim 1, wherein the deterministic package identifier is determined based at least in part on a hash of the build resources.

15. The system of claim 1, wherein the package is provided to an installation server.

16. The system of claim 1, wherein the target system is associated with a role.

17. The system of claim 16, wherein the selected software component is installed based at least in part on the role.

18. The system of claim 1, wherein installing the selected software component comprises installing selected directory locations from the package.

19. The system of claim 1, wherein in the event that the software component fails, the software component is reverted to a previous version of the package.

20. The system of claim 1, wherein installing the selected software component comprises checking the deterministic package identifier to verify that the package comprises the correct package version.

21. A method for building a package with a deterministic identifier for selective software component installation, comprising:

receiving, by a processor, package configuration information;

retrieving, by the processor, build resources;
  determining, by the processor, a deterministic package identifier based at least in part on the build resources, wherein determining the deterministic package identifier comprises:
    determining a set of hashes, wherein each hash of the set of hashes comprises a hash of a build resource of the build resources,
    creating a dictionary of the set of hashes,
    determining a serialization by serializing the dictionary in a deterministic way, and
  determining the deterministic package identifier by computing a hash of the serialization;
building, by the processor, a package based at least in part on the package configuration information using the build resources; and
providing, by the processor, the package and the deterministic package identifier, wherein a selected software component is installed based at least in part on the deterministic package identifier using the package.

22. A computer program product for building a package with a deterministic identifier for selective software component installation, the computer program product being embodied in a non-transitory computer readable storage medium and comprising computer instructions for:

receiving package configuration information;
retrieving build resources;
  determining a deterministic package identifier based at least in part on the build resources, wherein determining the deterministic package identifier comprises:
    determining a set of hashes, wherein each hash of the set of hashes comprises a hash of a build resource of the build resources,
    creating a dictionary of the set of hashes,
    determining a serialization by serializing the dictionary in a deterministic way, and
  determining the deterministic package identifier by computing a hash of the serialization;
building a package based at least in part on the package configuration information using the build resources; and
providing the package and the deterministic package identifier, wherein a selected software component is installed based at least in part on the deterministic package identifier using the package.

* * * * *